US008085125B2

(12) United States Patent
Bigdely Shamlo

(10) Patent No.: US 8,085,125 B2
(45) Date of Patent: Dec. 27, 2011

(54) METHOD, APPARATUS, AND SYSTEM FOR AN ELECTRONIC KEY USAGE HISTORY INDICATOR

(75) Inventor: Nima Bigdely Shamlo, San Diego, CA (US)

(73) Assignee: Nima Bigdely-Shamlo, San Diego, CA (US)

( * ) Notice: Subject to any disclaimer, the term of this patent is extended or adjusted under 35 U.S.C. 154(b) by 802 days.

(21) Appl. No.: 12/228,797

(22) Filed: Aug. 16, 2008

(65) Prior Publication Data

US 2009/0064746 A1 Mar. 12, 2009

Related U.S. Application Data

(60) Provisional application No. 60/970,941, filed on Sep. 8, 2007.

(51) Int. Cl.
*G05B 19/00* (2006.01)

(52) U.S. Cl. ...... 340/5.2; 340/540; 340/542; 340/686.1; 70/283.1

(58) Field of Classification Search ................... 340/5.2, 340/540, 542, 686.1, 523, 526, 527, 573.1; 70/283.1
See application file for complete search history.

(56) References Cited

U.S. PATENT DOCUMENTS

| | | | | | |
|---|---|---|---|---|---|
| 2,198,484 | A | | 4/1940 | Merkl | |
| 3,792,493 | A | * | 2/1974 | Hughes | 346/20 |
| 4,200,227 | A | * | 4/1980 | Lemelson | 235/382 |
| 4,297,569 | A | * | 10/1981 | Flies | 235/443 |
| 4,432,218 | A | * | 2/1984 | Hoener | 70/395 |
| 4,440,011 | A | * | 4/1984 | Klein | 70/438 |
| 4,631,943 | A | * | 12/1986 | Hoener | 70/395 |
| 4,686,358 | A | * | 8/1987 | Seckinger et al. | 235/382 |
| 4,747,282 | A | * | 5/1988 | Nyun | 70/426 |
| 4,789,859 | A | * | 12/1988 | Clarkson et al. | 340/5.65 |
| 4,908,605 | A | * | 3/1990 | Takatsuka | 340/542 |
| 4,936,896 | A | * | 6/1990 | Takatsuka | 70/432 |
| 4,987,776 | A | * | 1/1991 | Koon | 73/304 C |
| 5,003,801 | A | * | 4/1991 | Stinar et al. | 70/278.3 |
| 5,025,426 | A | * | 6/1991 | Blumberg et al. | 368/10 |
| 5,337,588 | A | * | 8/1994 | Chhatwal | 70/278.3 |
| 5,355,702 | A | * | 10/1994 | Escribens | 70/395 |
| 5,397,884 | A | * | 3/1995 | Saliga | 235/382.5 |
| 5,435,160 | A | * | 7/1995 | Linsalato et al. | 70/408 |
| 5,548,984 | A | * | 8/1996 | Miyatsu | 70/276 |
| 5,552,777 | A | * | 9/1996 | Gokcebay et al. | 340/5.54 |

(Continued)

OTHER PUBLICATIONS

Unknown Author, Physical access device status indicator—Key Fob Reminder, Jun. 26, 2006, Internet publication.

*Primary Examiner* — Benjamin C Lee
*Assistant Examiner* — Quang D Pham

(57) ABSTRACT

A system and apparatus are disclosed for indicating interactions between a key and a lock, and presenting this interaction information to the user. These apparatus and system are not specific to certain types of key or lock. In embodiments, the apparatus includes a number of detector switches to identify that the key has entered the lock. In other embodiments, the usage time is measured and presented to the user. In certain embodiments, the action performed with the key, 'lock' or 'unlock', is identified by a number of tilt switches or accelerometers to detect the direction of key rotation in the lock. An electric scheme and mechanical design of some apparatus embodiments are disclosed. A method for reading information by the user on the time of usage for a particular apparatus embodiment is described. A method for processing the interaction information in the form of records is also provided.

13 Claims, 6 Drawing Sheets

U.S. PATENT DOCUMENTS

| | | | | |
|---|---|---|---|---|
| 5,589,398 | A * | 12/1996 | Krause et al. | 436/164 |
| 5,595,080 | A | 1/1997 | Whinton | |
| 5,709,114 | A * | 1/1998 | Dawson et al. | 70/278.2 |
| 5,768,925 | A * | 6/1998 | Ozawa et al. | 70/408 |
| 5,870,917 | A * | 2/1999 | Mahot et al. | 70/408 |
| 6,035,677 | A * | 3/2000 | Janssen et al. | 70/278.3 |
| 6,255,957 | B1 * | 7/2001 | Sonderegger et al. | 340/686.1 |
| 6,318,137 | B1 * | 11/2001 | Chaum | 70/278.3 |
| 6,331,812 | B1 * | 12/2001 | Dawalibi | 340/5.2 |
| 6,476,712 | B1 * | 11/2002 | Achterholt | 340/447 |
| 6,575,005 | B1 | 6/2003 | Hunter | |
| 6,588,243 | B1 * | 7/2003 | Hyatt et al. | 70/278.2 |
| 6,675,650 | B1 * | 1/2004 | Paulo | 73/491 |
| 6,826,935 | B2 * | 12/2004 | Gokcebay et al. | 70/278.3 |
| 6,886,382 | B1 * | 5/2005 | St. Felix | 70/432 |
| 6,927,670 | B1 * | 8/2005 | Gokcebay et al. | 340/5.65 |
| 6,935,147 | B1 * | 8/2005 | St. Felix | 70/432 |
| 6,959,568 | B2 * | 11/2005 | Abeler | 70/432 |
| 7,113,070 | B2 * | 9/2006 | Deng et al. | 340/5.2 |
| 7,397,343 | B1 * | 7/2008 | Gokcebay et al. | 340/5.65 |
| 7,521,818 | B2 * | 4/2009 | Bergmann et al. | 307/10.2 |
| 7,866,195 | B2 * | 1/2011 | Levine | 70/432 |
| 2002/0113654 | A1 * | 8/2002 | Hart | 330/279 |
| 2003/0149513 | A1 * | 8/2003 | Muragishi | 701/1 |
| 2003/0164014 | A1 * | 9/2003 | Matsushita et al. | 70/456 R |
| 2004/0036625 | A1 * | 2/2004 | Omata et al. | 340/825.69 |
| 2004/0102167 | A1 * | 5/2004 | Shim et al. | 455/226.2 |
| 2005/0168320 | A1 * | 8/2005 | Henderson et al. | 340/5.25 |
| 2005/0248436 | A1 * | 11/2005 | Hohmann et al. | 340/5.72 |
| 2006/0044109 | A1 * | 3/2006 | Griffits et al. | 340/5.65 |
| 2008/0149711 | A1 * | 6/2008 | Griffits et al. | 235/385 |
| 2009/0201151 | A1 * | 8/2009 | De Levie et al. | 340/540 |
| 2009/0222786 | A1 * | 9/2009 | Malcolm | 717/100 |
| 2009/0229326 | A1 * | 9/2009 | Pukari et al. | 70/263 |
| 2009/0292487 | A1 * | 11/2009 | Duncan et al. | 702/63 |
| 2010/0150378 | A1 * | 6/2010 | Lee et al. | 381/104 |

* cited by examiner

METHOD, APPARATUS, AND SYSTEM FOR AN ELECTRONIC KEY USAGE HISTORY INDICATOR

CROSS REFERENCE TO RELATED APPLICATIONS

The present patent application claims the benefit of a U.S. provisional patent application No. 60/970,941 filed on Sep. 8, 2007, the disclosure of which is incorporated herein in its entirety by reference.

FIELD OF THE INVENTION

The present invention relates to keys, electronic devices, key covers, and more particularly, to methods of detecting key usage and presenting the usage information.

BACKGROUND OF THE INVENTION

Securing valuables by lock is a part of people's daily life. Since locking the apartment door is a routine task, this fact may be easily forgotten. This invention brings peace of mind to all those, who have at least once asked themselves: "Did I lock the door?" The present invention provides design embodiments for a device that can be attached to common keys and methods for use thereof, as well as user information, such as time and/or the action performed (locking or unlocking).

U.S. Pat. No. 2,198,484 to Merkl particularly claims 'Indicator Key' as follows: "In a key, the combination of a bit provided with an indicator end, said end being provided with a slot, an operating handle movably mounted on said bit end, said handle being provide with a stop pin projecting in said slot to limit the motion of the handle over a predetermined arc, and means, operatively associated with said indicator end and said handle and independent of said pin and slot, for positioning said handle on said end at the limits of said arc."

There is known a 'lock position indicator' according to U.S. Pat. No. 4,440,011 to Klein, teaching "A casing for holding a key in one of two pivoted positions. The key pivots about an axis extending along one edge thereof when a lock is turned by the user of the key. An indicator may be attached to the key for extension through a small opening in the casing or housing when the key is in one position and for retraction below the level of the casing periphery when the key is in the opposite position. In a second embodiment, a portion of the casing may be pierced along three edges and arranged so that, when the key is in one position, the pierced portion is pushed above the casing periphery and, when the key is pivoted to the second position, the pierced portion is coextensive with or below the casing periphery. In a third embodiment, an indicator may be pivotally fastened in position between halves of the casing for movement (a) above and (b) even with or below the periphery of the casing when the key is pivoted."

A 'locking key' is shown in U.S. Pat. No. 4,631,943 to Hoener, describing "A locking key, designed to preserve an indication of the lock-shifting (opening or closing) operation last performed, has a shank with an extension shaft rotatably received in an adjoining head, the relative rotation of the shank and the head being limited to 90.degree. or 180.degree. by a retaining pin in the head coacting with a part-circular recess on the shaft. The pin and the recess also serve to hold the head in a fixed axial position with reference to the shank. A spring-loaded detent in the shaft or elsewhere inside the head serves to index the two key portions in either of their limiting relative positions."

According to U.S. Pat. No. 5,595,080 to Hoener, "A lock condition indicator device which is adapted for affixation to a key for a cylinder lock has a substantially circular movable means adapted to be retained in juxtaposition to a head portion of the key, but rotatable about a longitudinal axis of the key when an engaging means on the circumference of the movable means encounters an obstructing means on an outer surface of the lock, resulting in the movable means being rotated into one of a plurality of indicator positions."

Another prior art example is U.S. Pat. No. 6,575,005 to Hunter describes "A locked/unlocked indicator for a key that shows whether a person has locked a door lock or any type of lock. The indicator has a base member having a window formed in the top surface that communicates with a channel formed in the bottom surface. A slide member has a thumb tab that extends upwardly through the aperture that allows the slide member to be slid back and forth between a position that indicates whether the door lock is locked or unlocked. The bottom of the slide member is a spring member that has curved lips on the front and rear end that make an audible sound when the slide member reaches both the locked and the unlocked position. The base member has adhesive on the bottom surface for attachment to the head member of a key."

There is known U.S. Pat. No. 6,935,147 to St. Felix describing 'Key with indicator and retractable shield', wherein: "The key with a lock-unlock indicator is operable with a complementary lock set. The key has a body and an elongated key stem extending therefrom. A toggle bar is pivotally mounted or disposed on the key stem. The toggle bar operates in conjunction with a lock cam and an unlock cam mounted on the face of the complementary lock set. When the operator turns the key in one direction, the lock cam motivates the toggle bar thereby shifting its position. An indicator disposed in the key body displaying a lock condition and an unlock condition. The lock cam is shielded with a retractable shield."

Another U.S. Pat. No. 6,886,382 to St. Felix teaches "The key with a lock-unlock indicator is operable with a complementary lock set. The key has a body and an elongated key stem extending therefrom. A toggle bar is pivotally mounted or disposed on the key stem. The toggle bar operates in conjunction with a lock cam and an unlock cam mounted on the face of the complementary lock set. When the operator turns the key in one direction, the lock cam motivates the toggle bar thereby shifting its position. An indicator disposed in the key body displaying a lock condition and an unlock condition."

The U.S. Pat. No. 6,886,382 discloses: "FIG. 6 diagrammatically illustrates an electronic lock-unlock indicator. Toggle 16 operates electrical switch 50 when the toggle 16 passes the switch. For example, a rocker switch or a other micro switch may be utilized on key stem 14 proximate the toggle and key body 12. Disposed in key body 12 is a battery 52; a visual display unit 54, and audible announcer 56, a signal conditioning circuit 58, and a reset button 60. Switch 50 is connected to the signal conditioner 58. The signal conditioner generates appropriate electronic signals to operate display 54 and audible announcer (speaker) 56. Display 54 shows a locked or unlocked word, symbol or color. Reset switch 60 permits the operator to reset the signal conditioner if the key body 12 erroneously indicates a locked or unlocked condition. Battery 52 is replaceable. Display 54 is visible to the user. Display 54 may be on an edge of the key or may be on either side or the back end of the key body."

Although there have been many mechanical designs for indicator devices that show the last action (lock or unlock) performed using a key, the element of time is usually neglected. None of the above examples of prior art exhibits any indication that the locking time information is available to the user in the mentioned devices.

SUMMARY OF THE INVENTION

It is, however, of little use if one knows that the key has been used to lock the door, but is not sure if this has happened a few minutes ago or yesterday, and because of this ambiguity one still needs to go back and check the door. This invention solves this problem by recoding the time the key has been used and readily displaying the time to the user.

It is also useful to know if the key has been used for locking or unlocking the lock. Accordingly, an inventive method is presented herein to find the direction of rotation of the key in the lock. By combining this information with the direction associated with securing a certain lock device, action performed by the key (lock or unlock) is identified and presented to the user.

In preferred embodiments, an inventive apparatus for indication of interactions between a key and a lock can be attached to most common household keys and does not require a special type of key or lock. This distinguishes the invention from custom made keys or locks that may provide similar functionality. The apparatus is simply attached to a common key and keeps a record of its usage. Information on the interaction, herein further called 'interaction information', is presented to the user by means of an information display, e.g. in the form of an LCD display, a number (one or a plurality) of LEDs, or other means capable to produce visual, auditory, or tactile signals.

In some embodiments, the interaction information includes information about the key usage and time of usage, which may be presented in the form of a number of records in a log of records. The records can then be presented to the user on the information display. Each record contains the time and, in some embodiments, the action performed (lock or unlock). The user may navigate through the log by operating user input means, such as pushing button(s) or other conventional controls. A simplified embodiment may only present a single record.

In at least some embodiments, the present invention relates to a method of detecting if the key has been used (the event of usage), i.e. entered in the lock. A number of sensor-control devices, such as detector switches are placed along the key blade near its intersection with the key bow (head of the key) in such a way that their actuator is pushed upon and creates an electric signal as the key enters the lock. This electric signal is then further processed by a preprogrammed control electric circuit (digital or analog), i.e. a controller. Based on the duration of the signal and other potential inputs, the control circuit decides whether there is enough evidence that the key has entered the lock and thus has been used. In the other words, the control circuit or controller decides if an interaction between the key and the lock has been occurred.

In some embodiments, the sensor-control devices can be represented by suitable sensors providing information about the direction of key rotation in the lock to the control circuit. These sensors may be of types that sense earth gravity, such as tilt switches, accelerometers (inclinometers), or the types that directly sense rotation, such as gyroscopes. As the key is being rotated in the lock, the electrical properties of these sensors change in discrete or continuous manner. This pattern is sent to and processed by the control circuit, which in combination with the signals received from the detector switch(es) or other means of detecting key usage decides if the key has been rotated in the lock and if so, has it been clockwise or counter-clockwise.

In at least some embodiments, after the control circuit decides that the key has been used, i.e. entered a lock, it creates a record containing the time of usage and, if available, the direction of key rotation in the lock. The record is then saved in some sort of memory, which can be accessed and read upon a user's request. This memory may be digital like RAM, EEPROM, or analog as an amount of electric charge stored in a capacitor. The time being recorded may be absolute, like full or partial date plus time in the day, or be relative to certain event or events, e.g. the last time the key has been used.

In at least some embodiments, the present invention relates to a method of displaying the interaction information. These embodiments include a number of visual indicators (for example light emitting diodes, LEDs), each corresponding to a period of time (for example 10 minutes or 1 hour). Duration of time, i.e. how long ago the key has been used, is displayed by illuminating one or two of these visual indicators in a way that the immediate indicators correspond to the higher and lower time periods are turned on. For example to display 30 minutes in an embodiment with three indicators of '10 Minutes', '1 Hour' and '1 Day', both indicators for '10 Minutes' and '1 Hour' are lighted. In the case that the time period being displayed is higher or lower than the indicator values, only one indicator closer to that period is lighted. For example to display two days only the indicator that corresponds to '1 Day' is lighted or to display 1 minutes only the indicator for '10 Minutes' is lighted in this example.

In some embodiments, key usage may be detected by measuring the capacitance of or other electrical properties of the key. For example, most keys and locks are made of metal, which is an electric conductor and may also act as a capacitor. Therefore, in these embodiments, the sensor-control device is represented by at least an electrical circuit that can be connected to the key and measure and monitor its capacitance. When the key fits into the lock, they become electrically connected and form a larger capacitor than the key itself. This increase in capacitance is detected by the measuring electrical circuit as evidence supporting key usage. Evidence of key usage from one or many sources, such as detector switches, tilt switches, accelerometers, and the key capacitance sensor may be combined to increase the accuracy of key usage detection.

In some embodiments, the interaction information may invoke auditory or tactile signals that may be produced to notify the user that a key action (locking or unlocking the corresponding lock) is detected. An auditory signal that varies each time, such as a short music sequence selected from a number of such sequences, may also be played after each key usage to produce a unique memory in user's mind and help him/her to remember that the key has been recently used.

Further, in at least some embodiments, interaction information may also be sent to other devices. This may occur in real time, as being collected, or after being collected and stored in memory of the inventive apparatus for a period of time, or in memory of other devices including but not limited to personal computers, cell phones, PDAs, or other electronic devices. The method of communication of interaction information may utilize wired devices, such as USB port, Serial port or FireWire, or wireless devices, such as Bluetooth, ZigBee, WiFi or other RF and infrared communication means. Interaction information may also be passed or shared through the Internet, or intranets, or a mesh network, or through any combination of the abovementioned means.

In at least some embodiments, usage information may be shared across several devices that implement the methods described hereinabove. For example, two or more of such apparatuses may communicate interaction information immediately after detection or by a delay. Each user who carries one or more of these apparatuses becomes aware of key usage actions or time of usage of others who carry such apparatuses.

Furthermore, in some embodiments, a central control unit may communicate with an array of such inventive apparatuses and record the interaction information regarding one or more locks. This information may be presented to the user, or shared with other such inventive apparatuses by means of aforementioned methods.

Yet, in some alternative embodiments, the key is normally physically shielded in a way that it cannot enter a lock. By pressing a button or actuating a similar release means, the user releases the key and is able to use the key. The inventive apparatus is so configured that the event of actuating the release means is substantially communicated to the control circuit to participate in the making of a decision on actual occurrence of the interaction between the key and the lock. In this embodiment, key usage is detected by receiving an electrical signal from the key release button. Furthermore, in at least some of these embodiments, tilt or force sensors may detect the direction of key rotation, which information, combined with the release information, can be processed by the control circuit, and its result is presented to the user.

BRIEF DESCRIPTION OF THE DRAWINGS

Identical reference numerals and letters in the drawings generally refer to the same elements in different figures, unless otherwise is specified in the description. A newly introduced reference numeral or letter in the description is enclosed into parentheses.

DETAILED DESCRIPTION OF THE PREFERRED EMBODIMENT

Figure 1:
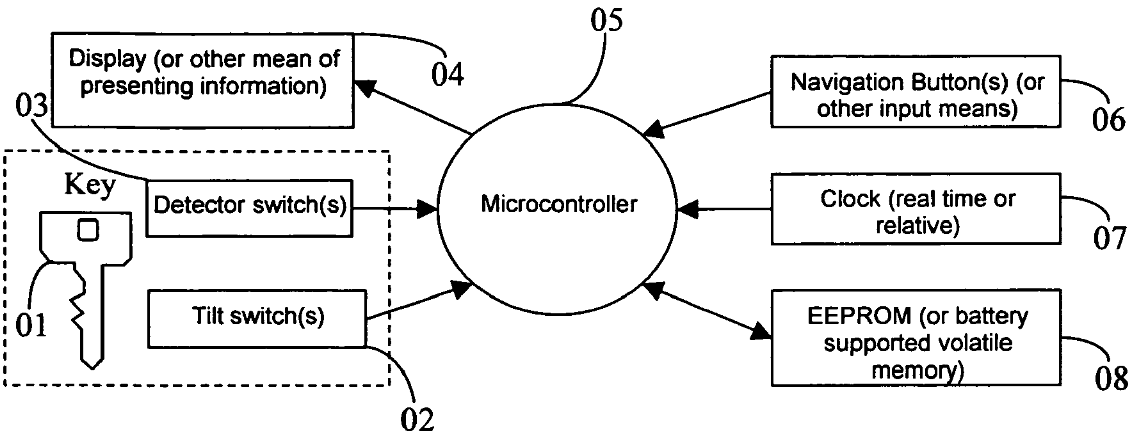
FIG. 1 shows a diagram of components and information flow in one embodiment of the invention.

While the invention may be susceptible to embodiment in different forms, there are shown in the drawings, and will be described in detail herein, specific embodiments of the instant invention, with the understanding that the present disclosure is to be considered an exemplification of the principles of the invention, and is not intended to limit the invention to that as illustrated and described herein.

Referring to a preferred embodiment, depicted on FIG. 1, the inventive system comprises a key (01), a number of tilt switches (02) and detector switches (03) that send information about key usage and rotation direction to a micro-controller (05). The micro-controller 05 processes this information and creates one or more usage records that contain a field of time of usage and, optionally, a field of direction of key rotation. These records are saved in some form of memory; herein an EEPROM type of memory is preferably used.

Time is provided by a clock (07) shown on FIG. 1 that may be implemented as a separate piece of hardware or be in the form of a software program running in the micro-controller. Additionally, time may be actual, a combination of date and time in the day, or it might be measured relative to an arbitrary origin and not be represented in the 'date/time' format. For example a timer in the micro-controller 05 may increase a counter each second as a basis for relative time.

The memory in which records are kept may reside in a separate piece of hardware or be embedded in the micro-controller itself. In at least some embodiments, the memory can be kept in an analog circuit such an amount of charge in a capacitor. Furthermore, this memory may be volatile, i.e. removed when the power is turned off such as RAM (random access memory), or it can be non-volatile such as EEPROM (08) as illustrated on FIG. 1 or Flash. The micro-controller component may be a digital device such as ATTINY24 or ATTINY13 from Atmel, an FPGA, an analog circuit, or a combination thereof.

Referring to FIG. 1, the user may request information about key usage by pressing navigation buttons (06) or similar input means, a voice command or gestures. These requests are sent to the micro-controller component that invokes the usage records from the memory and sends them to the display component (04). Key usage information may be presented in visual manner by lighting LEDs, as text and numbers on LCDs or similar devices or a combination of these. Furthermore, this information may also be presented as auditory signals such beeps or speech. In one embodiment the apparatus may produce speech and read how long ago the key has been used and has it been a lock or an unlock action. In some other embodiments, the information may be presented in tactile manner for example by activating a vibration motor.

Figure 2:
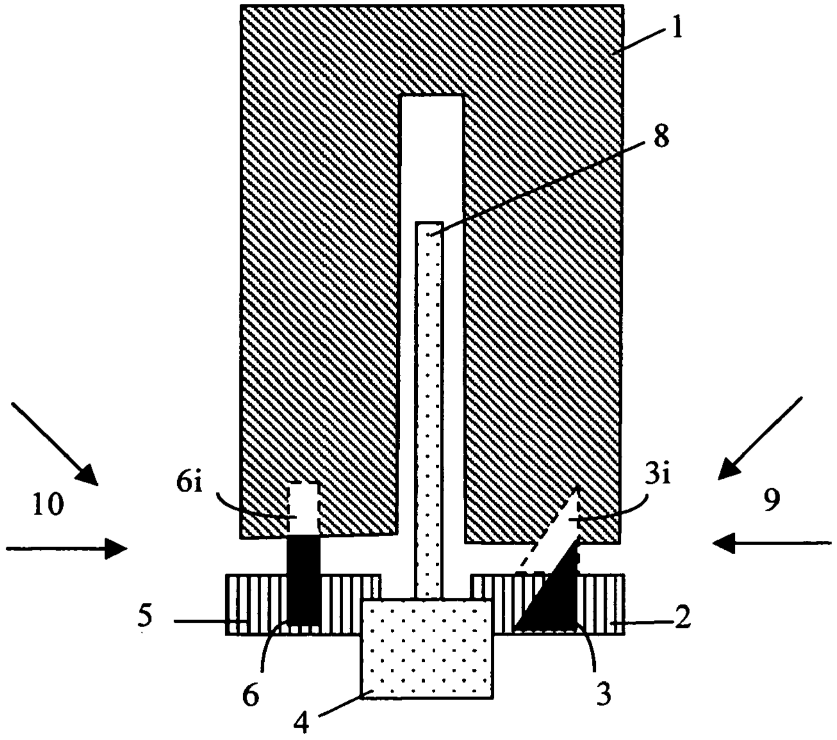
FIG. 2 illustrates a plan view of a key, a lock and two detector switches placed near the intersection of the key blade and the key bow. The actuators of these switches are being pressed upon as the key enters the lock.

Referring to FIG. 2, it shows a plan view of a preferred inventive embodiment, as seen from above. It illustrates a lock (1), a key having a key bow (4) and a key blade (8). The inventive apparatus is coupled to the key bow 4, and comprises two detector switches (2) and (5) having active sections respectively of a wedge-like shape (3) and of a cylindrical shape (6). As the key blade 8 advances into the lock 1, the surrounding body of the lock pushes the active section in and moves them from their initial positions (6*i*) and (3*i*) to new activated positions 6 and 3. This changes their electrical conductivity and signals the micro-controller. Since the body of the key shields each switch from external objects in the environment, most outer forces (9) and (10), applied from these objects, come from the direction opposite to the key. The active section 3 is less affected by random environmental pressure than the active section 6 because its wedge-like shape offers a lesser cross-section in the outward direction.

A tilt switch changes electrical conductivity (i.e. from 'open' to 'close') as it is tilted more than a certain angle relative to the horizon. One or more tilt switches may provide information about the direction of the key rotation in the lock. These switches are placed in a way that rotating the key in the lock causes them to rotate along their active axis, which may change their electrical state. This change sends a signal to the micro-controller. Each key rotation state (clockwise, counter-clockwise and, if defined, not rotated) is associated with one or more tilt switch activation patterns. The micro-controller calculates the duration of time and sequence of tilt switch activation patterns and determines the final state of the lock.

Figure 3A:
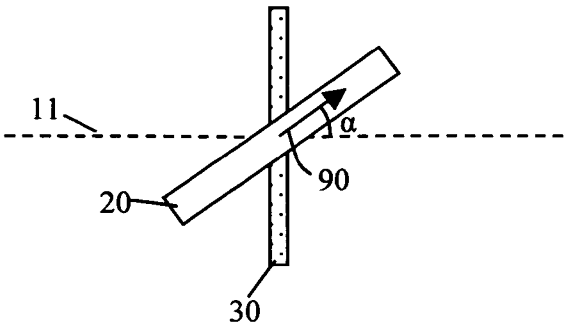
FIGS. 3*a* and 3*b* schematically and partially show two embodiments of the invention with single and double tilt switches with the view of looking parallel to the body of the key.
Figure 3B:
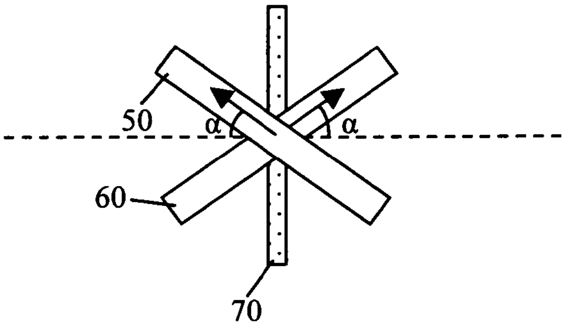

Referring to FIGS. 3*a* and 3*b*, they schematically show two embodiments of the invention with a single tilt switch (FIG. 3*a*), and a double tilt switch (FIG. 3*b*) with the view of looking parallel to the body of key (30). Key blades (30) and (70) are held perpendicular to a horizon line (11) while tilt switches (20), (50), and (60) are, directly or indirectly, attached to the blades in a way that revolving the key rotates the switches.

Operatively, an angle $\alpha$ between a sensitive axis (90) of the tilt switch 20 and the horizon line 11 changes as the key 30 is rotated in the lock. As $\alpha$ reaches a certain threshold, the switch 20 changes conductivity (for example closes an electric circuit) and sends a signal to the micro-controller. The micro-controller measures the portion of time the signal associated with each key rotation direction is received during the time that the key has been in the lock. To decide whether the rotation is clockwise or counter-clockwise, it then compares this ratio to a threshold calculated based on the response characteristics of the particular tilt switch being used.

For example, if the tilt switch 20 closes the circuit when its active axis 90 is below the horizon line 11, and the micro-controller has received the 'close' signal for more than 10 percent of time the key has been in lock, it may decide that the rotation has been clockwise. If the ratio is less than this threshold, the rotation is identified as counter-clockwise.

FIG. 3*a* shows an embodiment with two tilt switches 50 and 60. In addition to the clockwise and counterclockwise rotation, this embodiment can also detect a 'not rotated' state, in which the key is inserted in the lock and then taken out without any rotation. For example, tilt switches 50 and 60 may send separate 'close' signals, when their active axes reach the horizon line 11. If the micro-controller does not receive any 'close' signals during the time while the key is in the lock, or the signal is received for a negligibly short period of time, it means that effectively the key has not been rotated.

Figure 4:
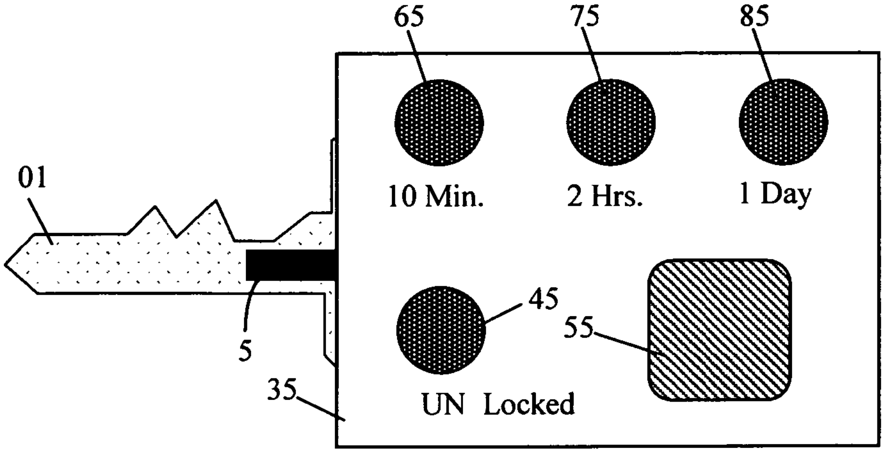
FIG. 4 illustrates an embodiment of the invention in the form of a key cover with LED time indicators and a detector switch.

Referring to FIG. 4, an exemplary user interface panel (35) is depicted for a preferred embodiment of the inventive apparatus. Light emitting diodes (LEDs) display the key action and time of each usage record. At least one detector switch 5 (similar to the one shown on FIG. 2) is placed next to the key 01. As a one-time setup, the user indicates which direction (clockwise or counter-clockwise) is associated with the lock action by setting a selector switch (not illustrated) on the back of the apparatus. Going through the log is possible by pressing a button (55). Depending on the time on the record, one or two of LEDs (65), (75), or (85), is (are) lighted to display the lower and/or the upper boundary (boundaries) on how long ago the key 01 has been used. For example, if the key 1 has been used an hour ago, both LEDs corresponding to '10 Min' and '2 Hrs' are lighted. If the action for the record is 'unlock', a LED (45) 'UN Locked' is also lighted.

Figure 5:
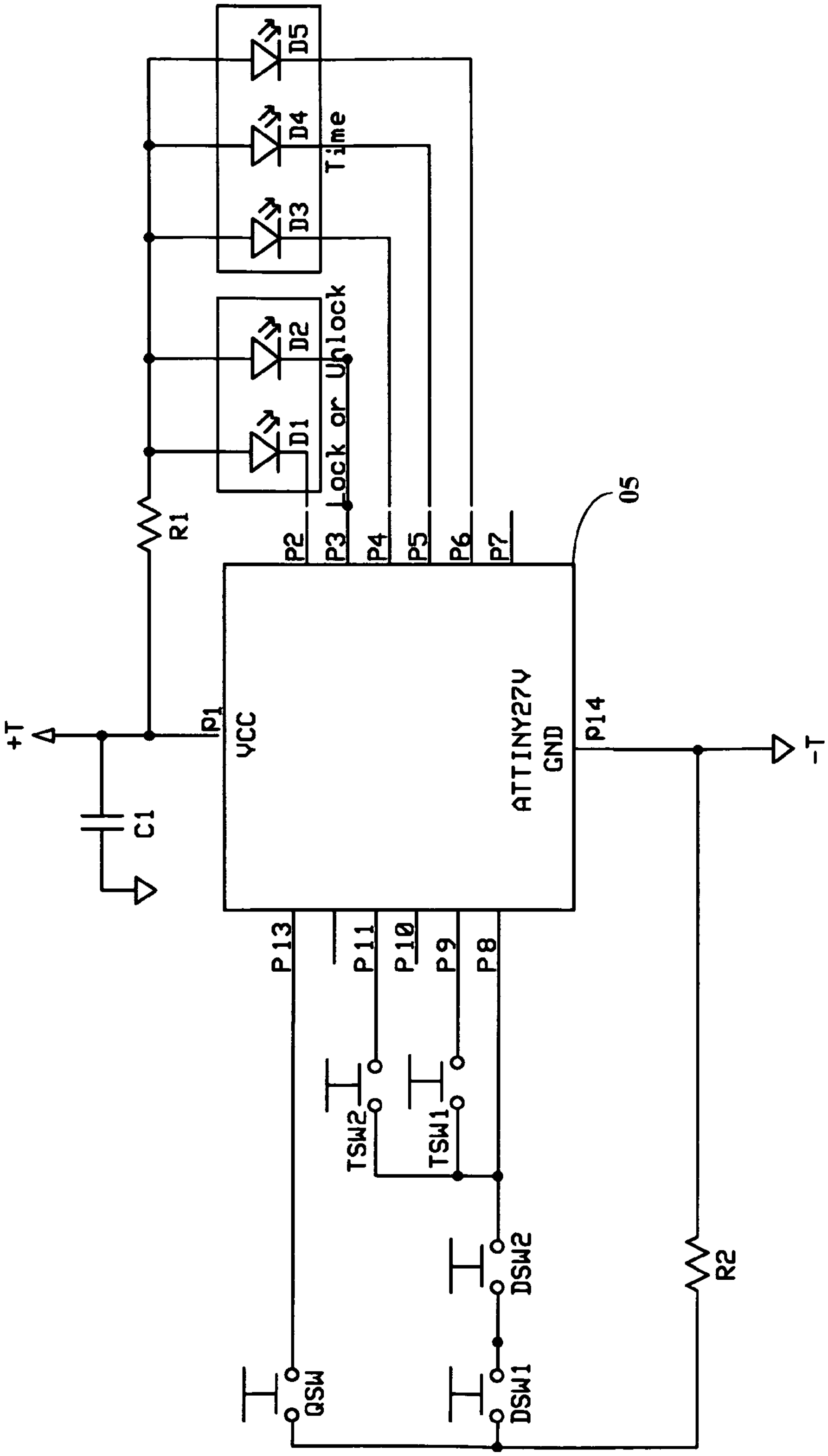
FIG. 5 shows an exemplary design of the electric control circuit for an inventive embodiment with two detector switches, two tilt switched, and a micro-controller.

Referring to FIG. 5, an exemplary design for the electric circuit is presented for a preferred inventive apparatus embodiment with two electric source terminals (+T) and (−T), two schematically shown detector switches (DSW1) and (DSW2) (preferably of a type of SPPB10300), two schematically shown tilt switches (TSW1) and (TSW2) (preferably of a type of 'Mountain Switch 107-1007') connected in parallel, and a micro-controller 05 with pins numbered from (P1) to (P14).

A high frequency filter capacitor (C1) is connected parallel to the electric source, as shown on FIG. 5. The circuit employs the micro-controller, preferably ATTINY26 from Atmel, that receives signals from the two tilt switches TSW1 and TSW2 and one query button (QSW) separately. The two detector switches DSW1 and DSW2 are connected serially to the micro-controller 05. This arrangement combines the signal from these two by an AND Boolean operation, which means that both the detector switches have to be activated in order to send a key usage signal to the micro-controller. This significantly reduces the chance of activation by random environmental forces and sending false key usage signal. Schematically illustrated LEDs (D1) and (D2) are utilized for indicating the 'Lock' and 'Unlock' positions, and LEDs (D3), (D4) and (D5) for indicating 'Time', e.g. similar to the indicators 65, 75, and 85 depicted on FIG. 4.

Figure 5A:
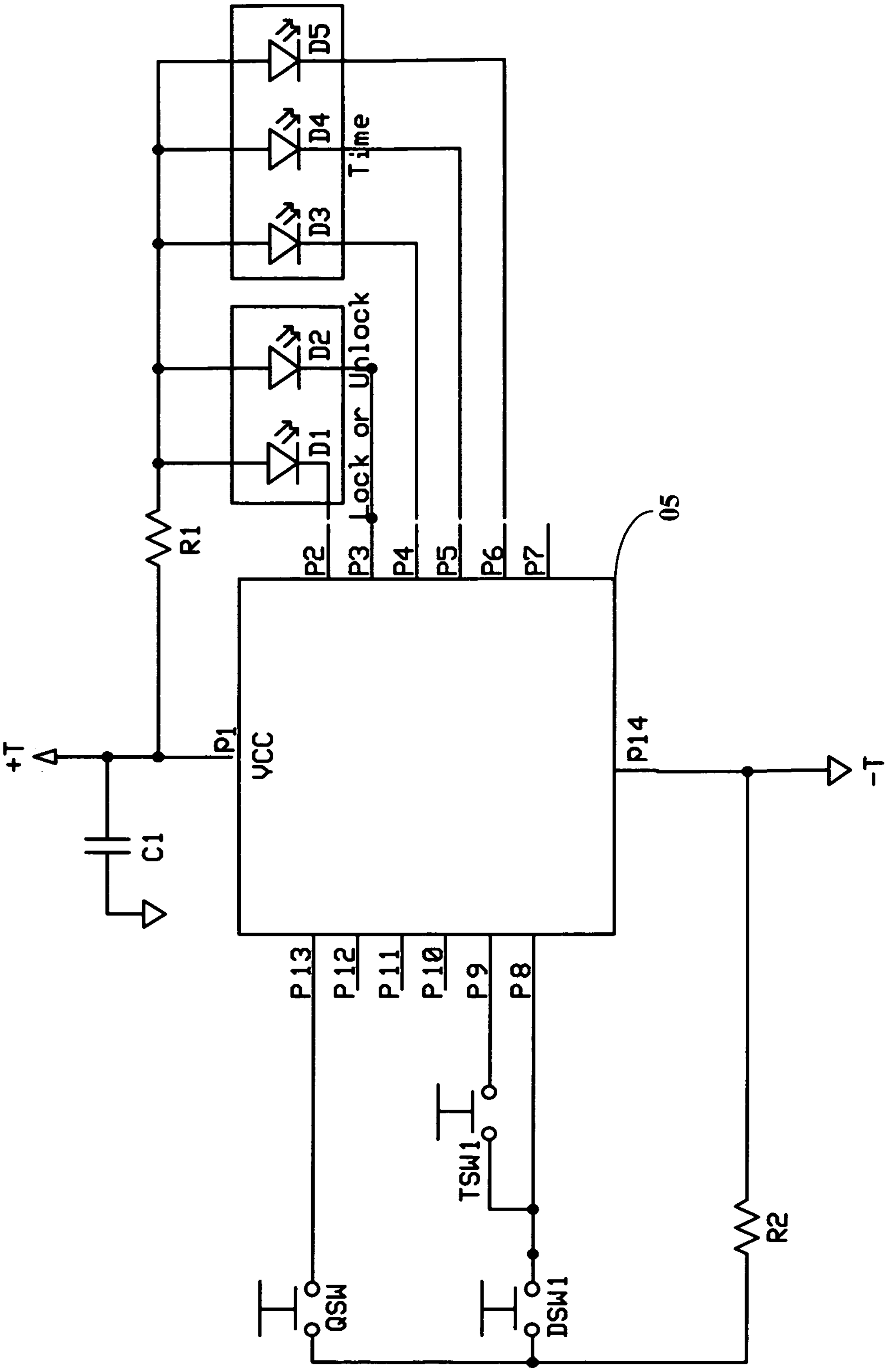
FIG. 5A shows an exemplary design of the electric control circuit for an inventive embodiment with one detector switch, one tilt switched, and a micro-controller.

In other embodiments of the invention depicted on FIG. 5A, only one detector switch (DSW1) and only one tilt switch (TSW1) may be used instead of these two pairs of switches. The chance of activation by random environmental forces may be reduced by increasing the amount of force necessary to activate the switch.

Figure 6A:
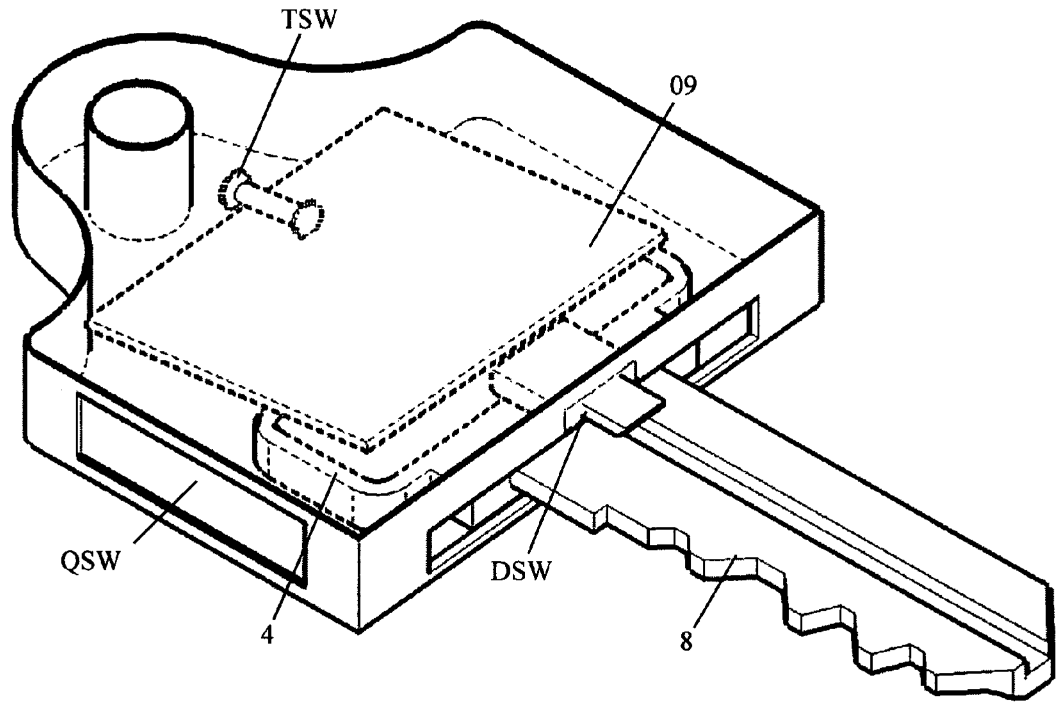
FIGS. 6A-6B show two views of the preferred embodiment of the invention.
Figure 6B:
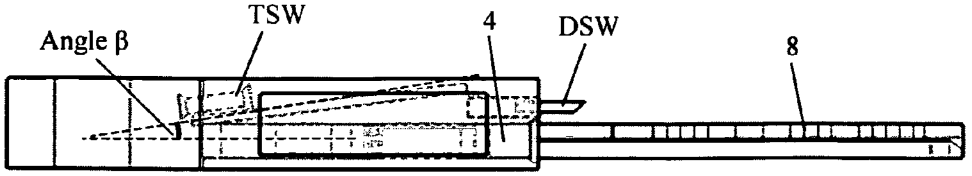

Referring to FIGS. 6A-6B, two views of a preferred inventive embodiment are illustrated. This embodiment employs one tilt switch (TSW) and one detector switch (DSW) shown on FIG. 6A, similar to those depicted on FIG. 2. The tilt switch TSW is placed in the direction of the key blade 8 with an angle $\beta$ to the plane of the key bow 4, as shown in FIG. 6B, which is a side view of the apparatus. Because of this specific arrangement, the rotation of the key in the lock changes the angle between the active axis of the tilt switch and the horizontal plane. The tilt switch is sensitive to changes in this angle and produces a signal that can be used to detect the direction of key rotation.

Figure 7:
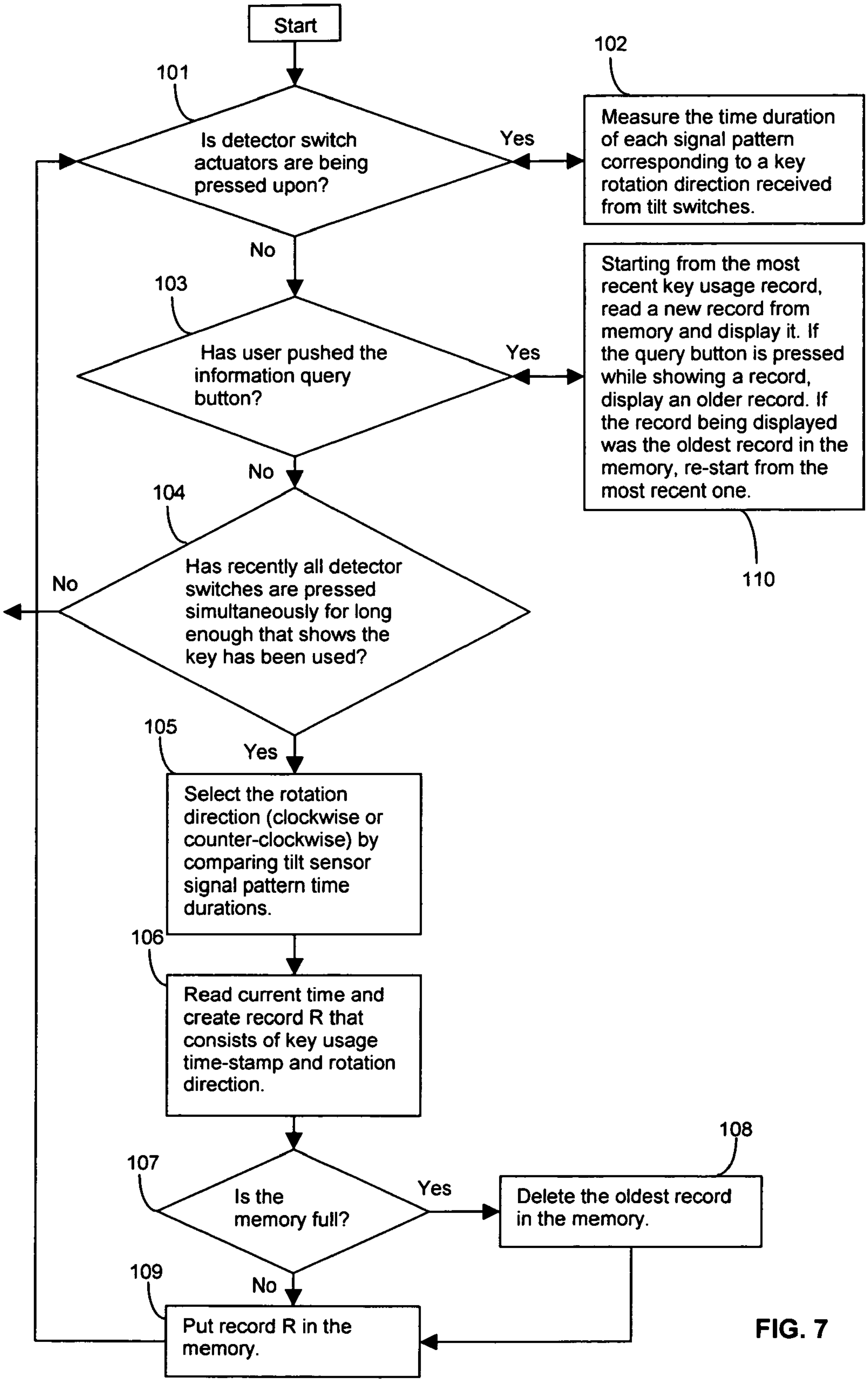
FIG. 7 is a flowchart showing exemplary steps of operation of an embodiment with detector switches and tilt sensors.

Referring to FIG. 7, a flowchart showing exemplary steps of operation of an embodiment with detector switch(es) and tilt switch(es) or sensor(s) is presented, wherein the actions of the steps are indicated in the corresponding rectangles and rhombs. In step (101), the positions of the detector switches and the duration of their activity are constantly monitored, which indicates that the key is in the lock, and are recorded. The duration in which all detector switches have been active is compared to a threshold. This is to make sure they all have been active for long enough that is not possible by a random mechanical shock (momentarily activation due to forces from the environment). If this duration is higher than threshold, it is decided that the key has been used.

In step (102), electric signal patterns received from the tilt switches, or other tilt sensors such as accelerometers, are measured during the time the key has entered the lock and the duration of time they correspond to each key rotation direction is recorded. Step (103) monitors the event of pushing the query button by the user. If the event has taken place, usage records are presented to the user. Step (104) monitors the simultaneous pressing of all detector switches. In step (105), this information is processed to decide whether the key has rotated in the lock and if so has it been clockwise or counter-clockwise. Step (106) encompasses reading the current time and creating a record of two fields: key usage time stamp and rotation direction. Steps (107) and (108) monitor the state of apparatus' memory. Step (109) serves to place the record in memory.

The methods for determination of the rotation directions corresponding to the signal patterns and the making of the final decision regarding the rotation direction are discussed hereinabove.

I claim:

1. A system including at least one apparatus for indication of interactions between at least one key and at least one lock, said apparatus comprising:

a sensor-control means substantially coupled with the key, said sensor-control means comprising at least one interaction detector means being configured to sense interaction information including at least key usage time information, and a rotation direction sensor means being configured to sense information on a direction of rotation of the key for said interactions;

a controller means for controlling of said apparatus and receiving said key usage time information and said rotation direction information from said sensor-control means, processing said received information, and making decisions on occurrence of said interactions, the controller means associated at least with said sensor-control means;

an information display means for presentation of said key usage time information and said rotation direction information, after the processing by said controller means, to a user in a predetermined form, said information display means associated with said controller means;

a clock means for providing time in another predetermined form to said controller means, said clock means associated with said controller means; and a memory means for storage of at least said key usage time information and said rotation direction information, said memory means associated with said controller means; and a user input means, associated with said controller wherein the controller processes said key usage time information and said rotation direction information in the following manner:

101) checking an event of key usage via said at least one interaction detector means, if positive—going to (102), if negative—going to (103);

102) measuring a duration of time for an event of key rotation;

103) checking an event of usage of said user input means, if positive—going to (110), if negative—going to (104);

104) checking if said at least one interaction detector means has been recently pressed long enough to make a decision on said event of key usage, if positive—going to (105), if negative—going to (101);

105) selecting the rotation direction based on signal time duration, going to (106);

106) reading current time from said clock means and creating a record R, going to (107);

107) checking whether the memory is full, if positive—going to (108), if negative—going to (109);

108) deleting the oldest record in the memory, going to (109);

109) placing the record R in the memory, going to (101); and 110) starting from the most recent record, reading a new record from the memory and displaying it; checking if the event of usage of said user input means is positive while showing a record, displaying the older record, if the record being displayed is the oldest record in memory, re-starting from the most recent record.

2. The system according to claim 1, wherein said apparatus further comprising user input means associated with said controller means.

3. The system according to claim 1, wherein said interaction information further including usage of the key.

4. The system according to claim 3, wherein said interaction information further including the direction of rotation of the key in the lock.

5. The system according to claim 1, wherein said interaction information further including the direction of rotation of the key in the lock.

6. The system according to claim 1, so configured that being capable of communicating said interaction information to or from other wired and/or wireless devices.

7. The system according to claim 6, so configured that being capable of communicating said interaction information through the Internet, or intranets, or a mesh network, or through any combination thereof.

8. The system according to claim 7, so configured that being capable of communicating said interaction information immediately after detection or by a delay.

9. The system according to claim 7, including a plurality of apparatuses for indication of interactions between at least one key and at least one lock, said system further comprising:

a central control unit capable of communicating with said plurality of apparatuses and record the interaction information regarding said at least one lock, wherein said system being so configured that capable of presenting said interaction information to the user, and/or sharing said interaction information throughout said plurality of apparatuses.

10. The system according to claim 1, further comprising:

a shield means for normally preventing the key from entering the lock; and a release means for releasing the shield means and permitting the key to enter the lock, wherein said apparatus being so configured that the event of actuating said release means substantially communicated to said controller means to participate in the making of a decision on occurrence of said interactions.

11. A method for obtaining, recording, and displaying interactions between a key and a lock, said method comprising the steps of:

providing a sensor-control means substantially coupled with the key, said sensor-control means comprising at least one interaction detector means being configured to sense key usage time information, and a rotation direction sensor means being configured to sense information on the direction of rotation of the key ‘clockwise’ or ‘counterclockwise’ for said interactions;

providing a controller means for receiving said key usage time information and said rotation direction information from said sensor-control means, processing the received information, and making a decision on occurrence of said interactions, said key usage time information and said rotation direction information being presented in the form of a number of records in a log of records, wherein said records each consisting of key usage time stamp and rotation direction fields;

providing an information display means for presentation of said key usage time information and said rotation direction information, after the processing by said controller means, to a user;

providing a clock means for providing time in a predetermined form to said controller means;

providing a memory means for storage of at least said key usage time information and said rotation direction information, said memory means associated with said controller means;

providing a user input means, associated with said controller means; and processing said key usage time information and said rotation direction information in the following manner:

101) checking an event of key usage via said at least one interaction detector means, if positive—going to (102), if negative—going to (103);

102) measuring a duration of time for an event of key rotation;

103) checking an event of usage of said user input means, if positive—going to (110), if negative—going to (104);

104) checking if said at least one interaction detector means has been recently pressed long enough to make a decision on said event of key usage, if positive—going to (105), if negative—going to (101);

105) selecting the rotation direction based on signal time duration, going to (106);

106) reading current time from said clock means and creating a record R, going to (107);

107) checking whether the memory is full, if positive—going to (108), if negative—going to (109);

108) deleting the oldest record in the memory, going to (109);

109) placing the record R in the memory, going to (101); and 110) starting from the most recent record, reading a new record from the memory and displaying it; checking if the event of usage of said user input means is positive while showing a record, displaying the older record, if the record being displayed is the oldest record in memory, re-starting from the most recent record.

12. The method according to claim 11, further comprising the step of displaying said key usage time information and said rotation direction information, after the processing by said controller means, to a user using said information display, wherein said information display including:

a plurality of visual indicators capable of illuminating being controlled by said controller means, wherein a first indicator is preset for a first time boundary, a second indicator is preset for a second time boundary greater than the first time boundary, etcetera, and a visual indicator of an ‘unlocked’ and/or ‘locked’ positions of the lock being controlled by said controller means upon occurrence of said ‘unlocked’ and/or ‘locked’ events respectively; and reading the interaction information, presented on said information display, by the user in the following manner:

a) while the visual indicator indicates the ‘unlocked’ position, the lock has been unlocked, wherein if only the first visual indicator is illuminated, the lock has been unlocked within a period of time not greater than the first time boundary;

if the first and second visual indicators are illuminated, the lock has been unlocked within a period of time greater than the first time boundary and not greater than the second time boundary; etcetera; or b) while the visual indicator indicates the ‘locked’ position, the lock has been locked, wherein if only the first visual indicator is illuminated, the lock has been locked within a period of time not greater than the first time boundary;

if the first and second visual indicators are illuminated, the lock has been locked within a period of time greater than the first time boundary and not greater than the second time boundary; etcetera;

wherein said ‘locked’ and/or ‘unlocked’ events of usage of the key of said interactions determined based on said direction of rotation of the key ‘clockwise’ or ‘counter-clockwise’.

13. The method according to claim 11, further comprising the step of reading said records by navigating the log with said user input means.

* * * * *